United States Patent

Newbrough et al.

(10) Patent No.: US 8,857,130 B1
(45) Date of Patent: Oct. 14, 2014

(54) CEMENTITIOUS PRODUCT TREATMENT PROCESSES

(71) Applicants: Bruce Newbrough, Pittsburgh, PA (US); Danielle Hunsicker, Pittsburgh, PA (US)

(72) Inventors: Bruce Newbrough, Pittsburgh, PA (US); Danielle Hunsicker, Pittsburgh, PA (US)

(73) Assignee: Ardex, L.P., Aliquippa, PA (US)

( * ) Notice: Subject to any disclaimer, the term of this patent is extended or adjusted under 35 U.S.C. 154(b) by 0 days.

(21) Appl. No.: 13/842,700

(22) Filed: Mar. 15, 2013

(51) Int. Cl.
  *E04B 1/00* (2006.01)
  *E04G 21/00* (2006.01)
  *E04G 23/00* (2006.01)
  *E04B 1/66* (2006.01)

(52) U.S. Cl.
  CPC ........................................ *E04B 1/66* (2013.01)
  USPC ...................................... 52/741.41; 52/741.4

(58) Field of Classification Search
  CPC ............ C04B 40/04; C04B 40/02; E04B 1/78
  USPC .............................. 52/741.41, 741.4; 264/426
  See application file for complete search history.

(56) References Cited

U.S. PATENT DOCUMENTS

| | | | | |
|---|---|---|---|---|
| 3,447,955 A | * | 6/1969 | Magee et al. | 427/445 |
| 4,485,137 A | * | 11/1984 | White | 428/57 |
| 5,520,862 A | * | 5/1996 | Face et al. | 264/40.1 |
| 5,549,956 A | * | 8/1996 | Handwerker | 428/73 |
| 5,780,367 A | * | 7/1998 | Handwerker | 442/235 |
| 5,855,978 A | * | 1/1999 | Handwerker | 428/57 |
| 6,033,757 A | * | 3/2000 | Murphy | 428/138 |
| 6,187,386 B1 | * | 2/2001 | Hundley | 427/393.6 |
| 6,780,369 B1 | * | 8/2004 | Darrow et al. | 264/426 |
| 7,488,523 B1 | * | 2/2009 | Muncaster et al. | 428/40.1 |
| 7,963,082 B1 | * | 6/2011 | Bauer | 52/514 |
| 8,327,602 B2 | * | 12/2012 | Smith | 52/741.4 |
| 2008/0054519 A1 | * | 3/2008 | McDonald et al. | 264/232 |
| 2009/0241453 A1 | * | 10/2009 | Dellinger et al. | 52/408 |
| 2010/0038818 A1 | * | 2/2010 | McDonald | 264/232 |
| 2011/0061334 A1 | * | 3/2011 | Smith | 52/741.4 |
| 2012/0076969 A1 | * | 3/2012 | Ponomarev et al. | 428/70 |
| 2013/0125501 A1 | * | 5/2013 | Smith | 52/741.4 |
| 2014/0079889 A1 | * | 3/2014 | Christidis et al. | 427/427.4 |

\* cited by examiner

*Primary Examiner* — Mark Wendell
(74) *Attorney, Agent, or Firm* — Carr & Ferrell LLP

(57) ABSTRACT

Processes for reducing deformation of concrete are provided herein. In some instances, the processes may include applying a moisture control membrane layer to control moisture loss of the concrete, applying an intermediate layer to the moisture control membrane layer, and applying a finish layer to the moisture control membrane layer to create a substantially level upper surface.

4 Claims, 2 Drawing Sheets

US 8,857,130 B1

CEMENTITIOUS PRODUCT TREATMENT PROCESSES

CROSS-REFERENCE TO RELATED APPLICATIONS

This application is related to U.S. patent application Ser. No. 13/841,850, filed on Mar. 15, 2013, titled "APPARATUSES FOR MIXING, PUMPING, AND DELIVERING SELF-LEVELING MIXTURES," which is hereby incorporated by reference in its entirety including all references cited therein.

FIELD OF THE INVENTION

The present technology relates generally to processes for reducing deformation of cementitious products during drying. More specifically, but not by way of limitation, the present technology may be used to reduce or eliminate deformation of products such as concrete or mortar.

BACKGROUND

Cementitious products such as concrete slabs are typically poured into a prepared form or foundation. Generally, these concrete slabs, such as slabs on ground or slabs on metal deck, dry or cure in a top-down manner, meaning that the uppermost portion of the slab will dry before the bottommost portion of the slab. This drying behavior typically causes slabs to exhibit some degree of deformation, such as warping, due to formation of a moisture gradient through the thickness (e.g., depth) of the slab. As a slab dries, an exposed top surface undergoes drying shrinkage while concrete in the lower portion of the slab does not shrink, or does not shrink in a corresponding manner. This differential shrinkage may result in a raising of the slab edges at joints and cracks. Commonly referred to as slab "curling," this distortion often requires remedial work, such as grinding and/or the application of a leveling course, to re-profile the concrete slab surface in preparation for the finish flooring.

SUMMARY OF THE PRESENT TECHNOLOGY

According to some embodiments, the present technology may be directed to a method for reducing deformation of concrete by: applying a moisture control membrane layer to control moisture loss of the concrete; applying an intermediate layer to the moisture control membrane layer; and applying a finish layer to the moisture control membrane layer to create a substantially flat and smooth upper surface.

According to some embodiments, the present technology may be directed to a method of applying a moisture control membrane layer to concrete to slow a drying rate of the concrete and prevent formation of a moisture gradient through the concrete.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
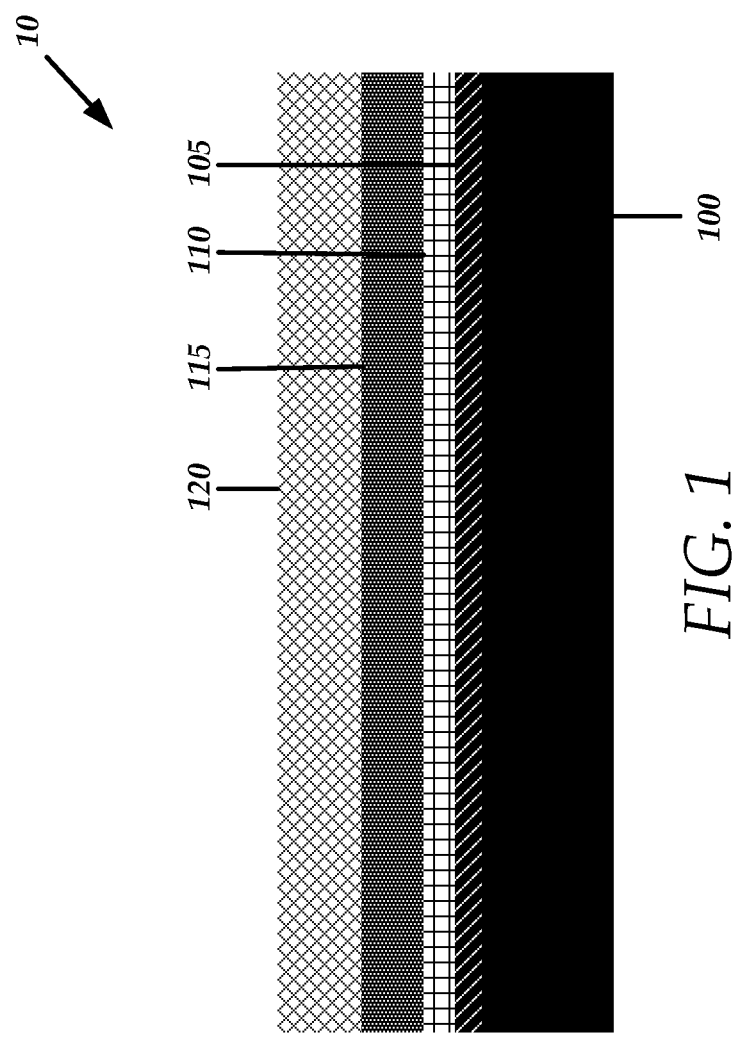
FIG. 1 is a cross sectional view of an exemplary concrete slab, treated in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology may be utilized to address slab curling, warping, or other deformations common in poured concrete. As mentioned above, concrete, such as slabs on ground or slabs on metal deck, typically dries from the top, down. These slabs tend to exhibit some level of warping due to the formation of a moisture gradient through the depth of the slab. As slabs dry for the exposed top surface, concrete in the upper portion of the slab undergoes drying shrinkage while concrete in the lower portion of the slab does not shrink. This differential shrinkage results in raising of the slab edges at joints and cracks. Commonly referred to as slab "curling," this distortion often requires remedial work, such as grinding and a leveling course, to re-profile the concrete slab surface in preparation for the finish flooring.

The present technology may include application of one or more layers of a moisture control membrane or intermediate layer shortly after slab placement to slow the drying rate of the concrete and reduce the formation of a moisture gradient through the slab depth. The application of the moisture control membrane/layers thus minimizes slab curling or other deleterious effects caused by the aforementioned non-uniform slab drying.

Figure 2:
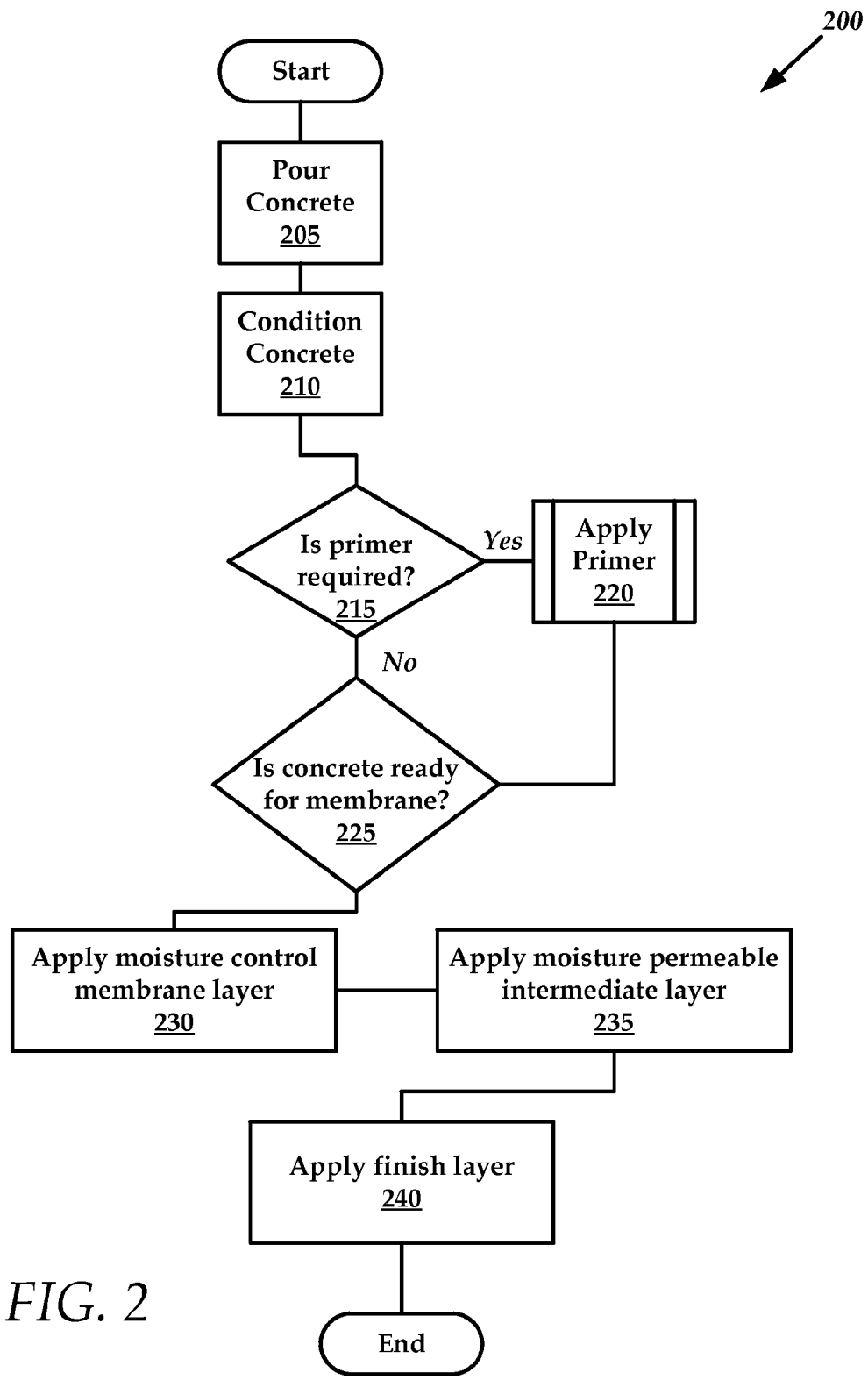
FIG. 2 is a flowchart of an exemplary method for reducing deformation of concrete.

Referring now to FIGS. 1 and 2 collectively, which illustrate a treated slab 10 and a process 200 for producing the treated slab 10, it is noteworthy that the processes described herein may equally be applied to other cementitious products such as mortar, grout, and so forth, to prevent deformation caused by uneven drying.

FIG. 1 illustrates a cross-sectional view of a section of a treated slab 10, which has been subject to a process of the present technology. FIG. 2 illustrates a flowchart of an exemplary process 200 for creating the treated slab 10 of FIG. 1. The following description will reference both FIGS. 1 and 2 concurrently.

The treated slab 10 may be created by implementing a first step 205 of pouring a slab 100. The slab 100 may be poured on a foundation such as soil, although the slab 100 may be poured over any foundation that would be known to one of ordinary skill in the art.

In some instances, after the slab 100 is poured, an upper surface 105 of the slab may be conditioned in step 210 to improve adherence between the slab 100 and a moisture control membrane 110. Exemplary processes for conditioning the slab 100 may include, but are not limited to machine floating and/or bullfloating the upper surface of the slab 100. In some instances, conditioning may include pan floating the surface 105 of the slab 100 to leave the surface open. Pan floating may create mechanical irregularities on the upper surface 105 of the slab 100 that facilitate an enhanced bond between the slab 100 and the moisture control membrane 110.

After conditioning the slab 100, bleedwater must be allowed to evaporate from the slab 100, as the presence of bleedwater salts on the slab 100 will reduce the bond between the slab 100 and the moisture control membrane 110. Once the bleedwater has evaporated, the surface of the slab 100 must be pan floated to reincorporate the bleedwater salts back into the concrete. Once the concrete has taken a firm set, a moisture control membrane 110 is applied via any desired means, such as painting, rolling, floating, and spraying—just to name a few.

Before the moisture control membrane 110 is applied, the installer may determine in step 215 whether primer is required. If primer is required, primer is applied in step 220.

The process moves to step 225 where the installer determines if the slab 100 is ready for the moisture control membrane 110. Generally, the step 225 is performed after the slab 100 has been allowed to dry for a period of time. It is noteworthy that the slab 100 may be allowed to cure until it becomes difficult or impossible to disturb (e.g., mark) the upper surface 105 of the slab 100, via a mechanical means, such as a brush. Indeed, an exemplary method for testing the readiness of the slab 100 for application of the moisture control membrane 110 includes application of firm pressure to the upper surface 105 of the slab 100 using a blunt object. If the blunt object fails to disturb the upper surface 105 of the slab 100, the moisture control membrane 110 may be applied.

To reduce deformation of the slab 100, which may cause curling or warping of the slab 100, a moisture control membrane 110 is be applied to the slab 100 to control moisture loss in step 230. Stated otherwise, the moisture control membrane 110 may slow a drying rate of the slab 100 and prevent formation of a moisture gradient through the slab 100.

In some instances, the moisture control membrane 110 may comprise a layer of a highly cross-linked epoxy that is applied to the slab 100 in a fluid form. Exemplary moisture control membrane products may include Ardex MC Rapid™, Ardex MC Ultra™, Ardex MC Plus™, Ardex MC MRP™ manufactured by ARDEX Engineered Cements of Aliquippa, Pa., or other similar moisture control products of similar permeability. Advantageously, the moisture control membrane 110 is applied to the slab 100 within twenty four hours of pouring the slab 100.

The moisture control membrane 110 may be rolled or otherwise applied to the slab 100. According to some embodiments, an intermediate layer 115 may be applied to the moisture control membrane 110 in step 235. The intermediate layer 115 may include, for example, a layer of aggregate, such as sand, which is broadcast or spread across the moisture control membrane 110 while the membrane is still fresh (e.g., green). After allowing the moisture control membrane 110 to dry, excess amounts of the intermediate layer 115 may be removed by sweeping, vacuuming, blowing, or other suitable methods.

When both the moisture control membrane 110 and the intermediate layer 115 have been applied to the slab 100, it is preferable that the vapor permeability of the treated slab 10 be approximately less than 0.2 perms, with vapor permeability being defined by the American Society for Testing and Materials (ASTM), Standard E96.

After removal of excess intermediate layer 115, a finish layer 120 must be applied to the intermediate layer 115 in step 240. In some instances, the finish layer 120 may comprise a self-leveling mixture, such as ARDEX SD-T™, Ardex K 15™ Premium Self Leveling Underlayment, and/or Ardex V 1200™ Self Leveling Underlayment although other suitable finish layer products may also likewise be utilized in accordance with the present technology.

Exemplary methods and apparatuses for applying a finish layer 120, such as those listed above are found in co-pending U.S. patent application Ser. No. 13/841,850, filed on Mar. 15, 2013, which is hereby incorporated by reference herein in its entirety.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for reducing deformation of concrete while the concrete is curing, the method comprising:
    applying a moisture control membrane layer to control moisture loss of an exposed upper surface of uncured concrete, the moisture control membrane layer comprising a layer of a cross-linked epoxy that is applied to the concrete in a liquid form;
    applying an intermediate layer to the moisture control membrane layer, in which the intermediate layer is a layer of aggregate; and
    applying a finish layer to the intermediate layer to create a substantially flat, smooth upper surface, in which the finish layer is a self-leveling mixture.

2. The method according to claim 1, further comprising pouring the concrete, and conditioning an upper surface of the concrete.

3. The method according to claim 2, further comprising allowing bleedwater to evaporate from the concrete.

4. The method according to claim 2, wherein conditioning comprises any of machine floating, bullfloating, and pan floating the upper surface of the concrete.

* * * * *